United States Patent [19]

Kovacs

[11] Patent Number: 5,255,993
[45] Date of Patent: Oct. 26, 1993

[54] PUSH BUTTON COUPLER

[75] Inventor: Austin Kovacs, Enfield, N.H.

[73] Assignee: U.S. Government Represented by the Secretary of the Army, Washington, D.C.

[21] Appl. No.: 880,263

[22] Filed: May 8, 1992

[51] Int. Cl.⁵ .................................................. F16B 7/00
[52] U.S. Cl. ..................................... 403/328; 403/316
[58] Field of Search ................................ 403/328, 316

[56] References Cited

U.S. PATENT DOCUMENTS

| | | | |
|---|---|---|---|
| 2,675,257 | 4/1954 | Specht | 403/328 |
| 4,339,148 | 7/1982 | Smith et al. | 403/328 X |
| 5,083,883 | 1/1992 | Ueda et al. | 403/328 |

Primary Examiner—Randolph A. Reese
Assistant Examiner—Anthony Knight
Attorney, Agent, or Firm—Luther A. Marsh

[57] ABSTRACT

The coupling and locking device of the present invention can be used to join together a rod and a tubular member of an auger flight section. Such a joint can be used in an auger drilling apparatus, or as the joining element in a structural space frame. The joint includes a push button contained in the rod member and an corresponding locking aperture in the tubular member. A retaining pin in the rod member can be used to selectively engage the push button against release from the locking aperture.

5 Claims, 2 Drawing Sheets

PUSH BUTTON COUPLER

BACKGROUND OF THE INVENTION

1. Field of the Invention

The Invention relates generally to devices for coupling tube and rod elements together and particularly to snap-fitting, spring-loaded push button devices which couple said elements and, on rotation of the push button, lock said coupled elements together.

2. Description of the Prior Art

Spring-loaded push button connectors have long been known in the art for coupling together rod-like elements to tubular elements and tubular elements to each other. Such situations are found in a variety of environments including the coupling together of frame sections such as are used in items as diverse as tripod legs and tubular frame furniture. In more active environments, such as the coupling together of lowering rods and auger flight sections, high torque forces, vibration and the like cause conventional push button couplers to disengage and allow decoupling of linked assemblies. In a situation such as drilling into the earth to form boreholes, cuttings conveyed past a conventional push button coupler by a spinning auger flight can produce decoupling of the auger. This event can leave some flight portions down hole within the borehole with the distal end of such a drill string then being possibly lost if the decoupled assembly cannot be retrieved from the borehole.

Accordingly, the prior art has experienced the need for a coupling device which is as simple as conventional push button coupling connectors but which are capable of locking the coupled elements together in an inexpensive and simple fashion. Further, the art requires a simple coupling and locking push button connector which allows rapid and simple decoupling as desired. The present invention provides such a simple, inexpensive and easily operable push button coupling connector which also is capable of locking the coupled elements together once coupling has been achieved.

SUMMARY OF THE INVENTION

The invention provides in several embodiments devices which comprise spring-loaded push button connectors particularly useful for coupling and locking together a substantially rod-like structural element and a tubular structural element, the rod-like structural element being received within the tubular structural element such that the spring-loaded push button snaps into an aperture formed in the tubular element. The push buttons of the several embodiments of the present invention act not only to couple the elements together but also to lock the elements together such that the push buttons cannot be accidentally or unintentionally depressed inwardly to decouple the elements. In the several embodiments of the invention, each push button is mounted within a congruent recess formed in the rod-like structural element, the recess acting as a guide for radial movement of the push button. Each push button is formed with at least one detent recess which, in combination with a retainer pin mounted in the rod-like element and extending laterally into the congruent recess, controls the extent of travel of the push button when the push button is in a first angular position. On rotation of the push button, the retainer pin engages a locking slot formed in the push button, the locking slot communicating with the detent recess, to lock the push button in that position which couples the structural elements together. The exterior face of each push button is provided with a slot for receiving a screw driver, coin, or the like so that the push button can be rotated to the locking position.

Accordingly, it is an object of the invention to provide spring-loaded push button connector devices capable of coupling a substantially rod-like structural element and a tubular structural element and which is further capable of locking the elements together on coupling thereof.

It is another object of the invention to provide spring-loaded push button connecting structures capable of rapid coupling and locking of rod and tube elements together and being further capable of rapid unlocking and decoupling of such elements.

It is a further object of the invention to provide push button connector devices which couple rod and tube structural elements together and which are inexpensively fabricated and simple and reliable in operation.

Further objects and advantages of the invention will become more readily apparent in light of the following detailed description of the preferred embodiments.

DESCRIPTION OF THE PREFERRED EMBODIMENTS

Figure 1:
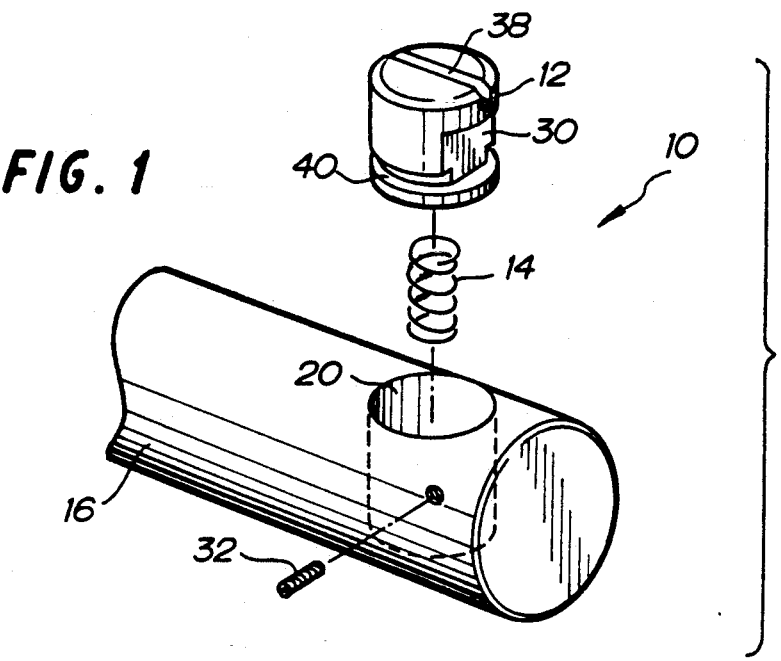
FIG. 1 is an assembly view of a rod-like structural element receiving a first embodiment of the invention in a recess congruent with a spring-loaded push button connector disposed at an end of the element.

Referring now to the drawings and particularly to FIGS. 1 through 4, a first embodiment of the invention comprises a connector seen generally at 10 to comprise a push button 12 and a coil spring 14 which act to couple together a rod 16 and a tubular sleeve 18, an end of the rod 16 being received into the tubular sleeve 18 for coupling by means of the connector 10. The rod 16 and the sleeve 18 can be circular in cross-section or may be otherwise shaped in section but should be substantially congruent in section so that the rod 16 can fit into the tubular sleeve 18. Further, the rod 16, although shown as solid in the drawings, can also be tubular as long as a housing is formed in the rod 16 for receiving the push button 12 and coil spring 14.

As seen in FIG. 1, the push button 12 and the coil spring 14 are received within a recess 20 formed in the rod 16, the recess being of a shape which is congruent with the shape of the push button 12 such that the push button 12 can be received into the recess 20 and moved inwardly and outwardly of the recess 20. In preferred embodiments, the push button 12 is substantially cylindrical in conformation and the recess 20 is also cylindrical in conformation and is only slightly larger in diameter than is the push button 12 such that the push button 12 is movable within the recess 20 in a direction perpendicular to the axis of the rod 16.

Figure 2:
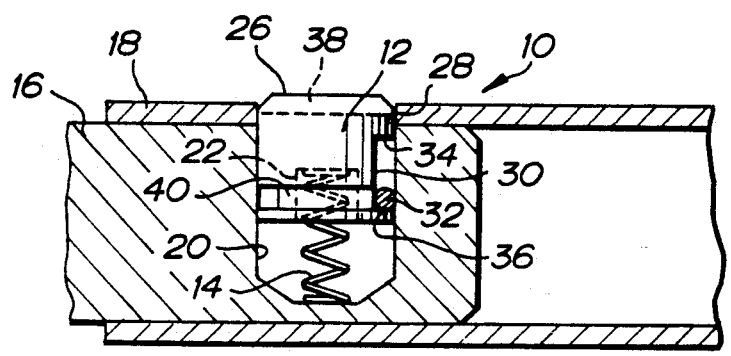
FIG. 2 is a side elevational view of a first embodiment of the invention illustrating the coupling of a rod element to a tubular element.
Figure 3:
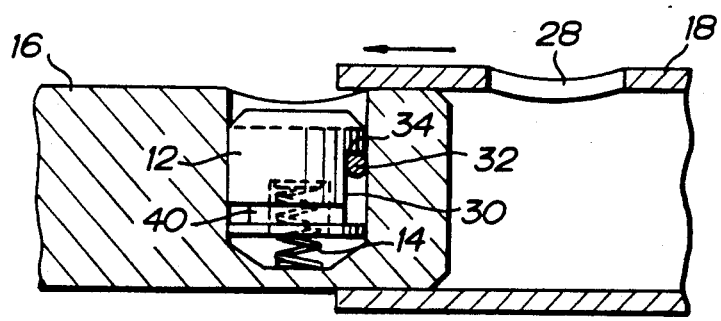
FIG. 3 is a side elevational view of the embodiment of FIG. 2 but with the push button in an uncoupled position.

One end of the coil spring 14 is received within spring recess 22 formed centrally in inner face 24 of the push button 12. The end of the coil spring 14 fitting into the spring recess 22 contacts and is biased against upper surfaces of said recess 22. The other end of the coil spring 14 extends into engagement with floor portions of the recess 20. Accordingly, the push button 12 can be depressed into the recess 20 as is best seen in FIG. 3, the spring 14 then being compressed such that the push button 12 will spring outwardly from the recess 20 when pressure against outer face 26 of the push button 12 is relieved. As seen in FIG. 2, the tubular sleeve 18 is formed with an aperture 28 which is of a diameter only slightly greater than the diameter of the outer face 26 of the push button 12. When the tubular sleeve 18 is fitted over the rod 16, the push button 12 is biased inwardly into the recess 20, thereby allowing the sleeve 18 to be slipped onto the rod 16. On alignment of the aperture 28 in the sleeve 18 with the push button 12, the push button 12 snaps outwardly by virtue of bias provided by the spring 14. The outermost end of the push button 12 is thus received into the aperture 28 in the sleeve 18 to couple the rod 16 and the sleeve 18 together as is seen in FIG. 2.

The perimeter of the outer face 26 of the push button 12 is preferably sloped or beveled to facilitate receipt thereof into the aperture 28 of the sleeve 18 and also to facilitate biasing inwardly of the push button 12 on fitting of the sleeve 18 over the rod 16. The end of the rod 16 may also be sloped or beveled in order to facilitate receipt of the end of the rod 16 into the sleeve 18.

The push button 12 is formed with a detent recess 30 formed in lateral side walls of said push button 12. The detent recess 30 substantially comprises a chord-like cut-out and is intended to receive a pin 32 which acts as a retainer to control the degree of travel of the push button 12 within the recess 20. The pin 32 is fixedly mounted within the rod 16 such that at least a portion of the pin 32 extends into the recess 20 and fits into the detent recess 30 to control the degree of inward and outward movement of the push button 12 within the recess 20. As is seen in FIG. 3, depression of the push button 12 fully into the recess 20 causes the pin 32 to abut against outward detent shoulder 34 to prevent further inward movement of the push button 12. Similarly, outward movement of the push button 12 which occurs on release of pressure against said push button 12, and as is seen in FIG. 2, causes the pin 32 to abut against inward detent shoulder 36 of the detent recess 30, thereby preventing further outward movement of the push button 12. The outward movement of the push button 12 allowed by the cooperation of the detent recess 30 and the pin 32 is sufficient to allow outer portions of the push button 12 to be received within the aperture 28 to couple the rod 16 and the sleeve 18 together.

Figure 4:
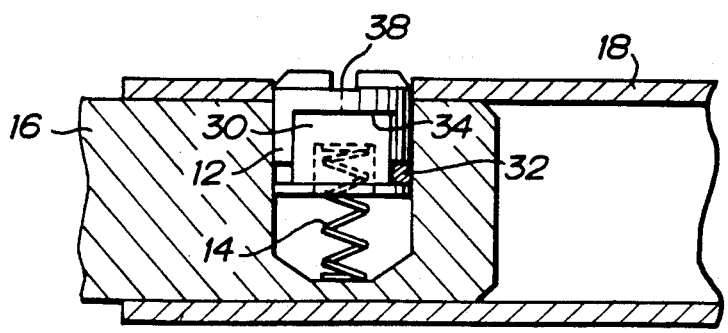
FIG. 4 is a side elevational view of the first embodiment of the invention illustrating the engagement of a retainer pin in a locking slot of the push button.

The outer face 26 of the push button 12 is formed with a diametrical slot 38 which allows use of a screw driver, coin or the like to rotate the push button 12 when the push button 12 is in the position shown in FIG. 2. A locking slot 40 is formed in a lateral side wall of the push button 12 at a location wherein a first end of the slot 40 communicates with the detent recess 30. When the push button 12 is in the fully extended position or the coupled position such as is shown in FIG. 2, rotation of the push button 12 causes the pin 32 to be received into the locking slot 40. A full 90° rotation of the push button 12 which is conveniently occasioned through use of a tool in engagement with the slot 38 causes the pin 32 to be fully moved from the detent recess 30 and into the locking slot 40. In this position, as is shown in FIG. 4, the push button 12 is best locked from movement within the recess 20 and is thus prevented from being depressed inwardly to decouple the rod 16 and sleeve 18. For convenience of illustration, the rod 16 and the sleeve 18 are not shown in FIG. 4 inter alia. While a full 90° rotation of the push button 12 provides greatest locking capability, it is readily realized that a lesser rotation will cause at least portions of the pin 32 to be received within at least portions of the locking slot 40. Locking will thus occur at less than a 90° rotation of the push button 12. However, more positive locking is occasioned by a full 90° rotation of the push button 12.

Figure 5:
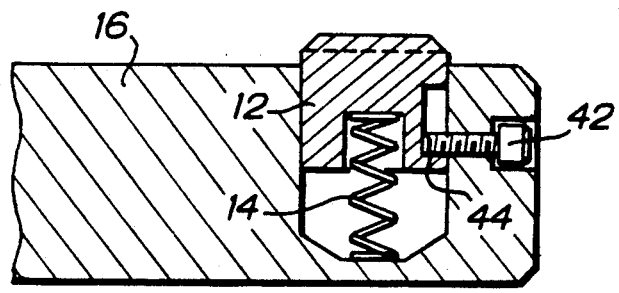
FIG. 5 is a side elevational view of a second embodiment of the invention illustrating the location of a retainer pin extending into a congruent recess receiving a push button from a direction essentially parallel to the longitudinal axis of the rod element.

Referring now to FIG. 5, a second embodiment of the invention is seen to be substantially identical to the embodiment of FIGS. 1 through 4. For this reason, elements of the embodiment of FIGS. 1 through 4 which are common to the embodiment of FIG. 5 are identified in a like manner. However, the embodiment of FIG. 5 disposes a pin 42 substantially in a direction along or parallel to the longitudinal axis of the rod 16. Accordingly, only distal end 44 of the pin 42 extends into the recess 20 and thus into the detent recess 30 when in the unlocked configuration and into the locking slot 40 in the locked configuration.

Figure 6:
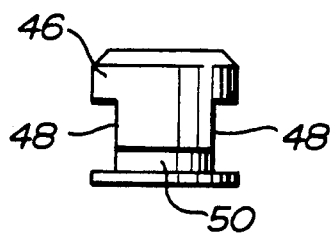
FIG. 6 is a side view of a push button modified according to a further embodiment of the invention.
Figure 7:
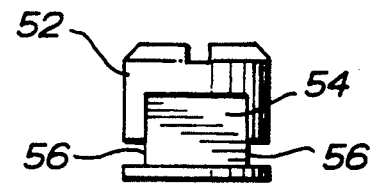
FIG. 7 is a side view of a push button modified according to yet another embodiment of the invention; and, FIG. 8 is a side view of a push button modified according to a still further embodiment of the invention.
Figure 8:
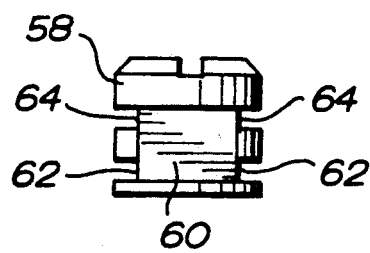

Referring now to FIGS. 6, 7 and 8, alternative embodiments of push button structures which function similarly to the push button 12 of FIGS. 1 through 4 are shown. In FIG. 6, a push button 46 is shown having diametrically disposed detent recesses 48. Extending between the detent recesses 48 on either side thereof are two locking slots 50. Accordingly, disposition of the push button 46 within the recess 20 of the embodiment of FIGS. 1 through 4 would allow usage of two of the pins 32 disposed in diametric opposition across the recess 20 such that the push button 46 could be rotated either clockwise or counterclockwise to lock the push button 46 in its fully extended position. A further feature of the push button 46 of FIG. 6 is that the two pins 32 which would be used with the push button 46 act to balance the push button 46 within the recess 20 and prevent cocking of said push button 46 within said recess 20.

FIG. 7 illustrates a push button 52 having one detent recess 54 which is substantially identical in shape and operation to the detent recess 30 of FIGS. 1 through 4. However, two diametrically opposite locking slots 56 extend from the detent recess 54 near the inner face of the push button 52, thereby allowing the push button 52 to be rotated in either direction such that a single pin such as the pin 32 of the embodiment of FIGS. 1 through 4 can be received into one of the locking slots 56 depending upon the direction of rotation of said push button 52. Locking thus occurs regardless of the direction of rotation of the push button 52.

FIG. 8 illustrates a push button 58 having a single detent recess 60 essentially identical in shape and function to the detent recess 30 of FIGS. 1 through 4. The push button 58 is provided with locking slots 62 which are substantially identical in shape and function to the locking slots 56 of FIG. 7, the locking slots 62 being used to lock the push button 58 into an extended or "coupled" position as has been the case with all previous embodiments of the invention. As with the embodiment of FIG. 7, the push button 58 of FIG. 8 can be rotated in either direction to lock the push button 58 into the extended position. However, the push button 58 also is provided with outer locking slots 64 which extend from the detent recess 60 at outer ends thereof such that a pin such as the pin 32 of FIGS. 1 through 4 can be received into the outer locking slot 64 to lock the push button 58 into a position wherein said push button 58 is fully received within a recess such as the recess 20 formed in the rod 16 of FIGS. 1 through 4. In other words, the push button 58 of FIG. 8 can be locked in both the fully extended and fully depressed positions. The push button 58 can be rotated in either direction to provide these locking functions.

The connector structures of the present invention provide inexpensive and readily and rapidly operated coupling and locking devices which can be decoupled equally rapidly and readily. The substantially flush receipt of the several push buttons of the invention within recesses formed in the rod-like elements acts to prevent water infiltration and thus freezing of the connector when used in a wet environment under cold conditions. This "closed" arrangement of the push buttons within said recesses further acts to prevent the entry of dirt and other contaminants into the connectors of the invention, these conditions being capable of affecting proper functioning of the connectors of the invention.

What is claimed is:

1. Apparatus for joining a rod element and a tubular element, an end of the rod element being received within an end portion of the tubular element, the tubular element having an aperture formed therein and the rod element having a recess formed therein, comprising:

a push button received in and movable within the recess formed in the rod element, the push button having a detent recess formed therein and a locking slot formed adjacent to the detent recess adjacent that end of the push button located interiorly of the recess;

a spring disposed within the recess in the rod element, one end of the spring biasing against the push button and the other end of the spring biasing against floor portions of the recess in the rod element; and, a pin fixedly mounted to the rod element with the longitudinal axis of the pin extending in a direction perpendicular to the longitudinal axis of the rod and having at least a portion extending into the recess formed in the rod element, at least a portion of the pin being received within the detent recess to control inward and outward movement of the push button in the recess formed in the rod element, the push button being received into the aperture formed in the tubular element on alignment of the push button with said aperture to couple the rod element and the tubular element together, the pin contacting a portion of the detent recess to limit the extension of the push button into the aperture, rotation of the push button within the recess in the rod element causing engagement of the pin with the locking slot to lock the push button in that position coupling the rod element and the tubular element together.

2. The apparatus of claim 1 wherein one detent recess is formed on each side of the push button in diametric opposition to each other, the locking slot extending between the detent recesses.

3. The apparatus of claim 1 wherein one locking slot is formed in the push button adjacent to each side of the detent recess at that end of the push button disposed interiorly of the recess formed in the rod element.

4. The apparatus of claim 3 wherein one locking slot is formed in the push button adjacent to each side of the detent recess at that portion of the detent recess which is disposed outermost of the recess formed in the rod element.

5. The apparatus of claim 1 wherein one locking slot is formed in the push button adjacent to each side of the detent recess at that portion of the detent recess which is disposed outermost of the recess formed in the rod element.

* * * * *